US006655486B2

United States Patent
Oshikawa et al.

(10) Patent No.: US 6,655,486 B2
(45) Date of Patent: Dec. 2, 2003

(54) ENGINE ENCLOSURE FOR CONSTRUCTION VEHICLES

(75) Inventors: Yushi Oshikawa, Komatsu (JP); Masataka Uno, deceased, late of Ishikawa (JP), by Yuriko Uno, executor

(73) Assignee: Komatsu Ltd., Tokyo (JP)

( * ) Notice: Subject to any disclaimer, the term of this patent is extended or adjusted under 35 U.S.C. 154(b) by 27 days.

(21) Appl. No.: 09/892,621

(22) Filed: Jun. 28, 2001

(65) Prior Publication Data

US 2002/0017408 A1 Feb. 14, 2002

(30) Foreign Application Priority Data

Jul. 11, 2000 (JP) ........................................ 2000-209873

(51) Int. Cl.⁷ .............................................. B60K 11/08
(52) U.S. Cl. ..................................... 180/68.1; 180/69.2
(58) Field of Search ............................. 180/68.1, 68.2, 180/68.4, 69.2; 123/41.56; 165/149

(56) References Cited

U.S. PATENT DOCUMENTS

| 3,207,250 A | * | 9/1965 | Bamford ..................... 180/68.1 |
| 4,086,976 A | * | 5/1978 | Holm et al. ............. 123/41.49 |
| 4,696,361 A | * | 9/1987 | Clark et al. .............. 123/41.43 |
| 5,551,505 A | * | 9/1996 | Freeland ..................... 165/41 |
| 5,813,491 A | * | 9/1998 | Sato et al. .................. 180/309 |
| 5,816,351 A | * | 10/1998 | Akira et al. ................ 180/68.1 |
| 6,202,777 B1 | * | 3/2001 | Surridge ..................... 180/68.1 |
| 6,390,770 B1 | * | 5/2002 | Takeshita ..................... 415/119 |
| 6,427,798 B1 | * | 8/2002 | Imashige ................. 123/41.31 |
| 6,431,299 B1 | * | 8/2002 | Asche et al. ............... 180/68.1 |
| 6,435,264 B1 | * | 8/2002 | Konno et al. ............ 123/41.49 |
| 2001/0007292 A1 | * | 7/2001 | Yabf ......................... 180/68.1 |

* cited by examiner

*Primary Examiner*—Brian L. Johnson
*Assistant Examiner*—J. Allen Shriver
(74) *Attorney, Agent, or Firm*—Varndell & Varndell, PLLC

(57) ABSTRACT

An engine enclosure for a construction vehicle which is simply constructed and small-sized, while improving the cooling efficiency and lowering the noise. The engine enclosure including: an engine hood 15 having an ambient air inlet port 24; and engine side covers 16 having ambient air inlet ports 38. The engine enclosure is constructed to include an ambient air screening wall around a muffler 5 so that the cooling ambient air taken from the ambient air inlet ports 24 and 38 may flow to a fan without contacting with the muffler 5. With this construction, the air around the muffler and especially at a high temperature in the engine room and the cooling ambient air taken from the engine hood and the engine side covers can be screened from each other so that the temperature rise in the cooling ambient air to be fed to a heat exchanger such as a radiator can be reduced to improve the cooling efficiency.

7 Claims, 4 Drawing Sheets

VEHICLE FRONT SIDE                                    VEHICLE CAB SIDE

ENGINE ENCLOSURE FOR CONSTRUCTION VEHICLES

BACKGROUND OF THE INVENTION

1. Field of the Invention

The present invention relates to an engine enclosure for a construction vehicle and, more particularly, to an engine enclosure for a construction vehicle having a screening construction, in which ambient air, as taken into an engine room from ambient air passing holes formed in an engine hood and engine side covers enclosing the engine, for cooling a heat exchanger is guided to flow to a fan without contacting with a muffler positioned in the engine room.

2. Related Art

If the construction vehicle such as a bulldozer is of the ambient air intake type in which a wind for cooling a radiator arranged on the vehicle front side is established by a fan, the cooling wind having passed the radiator entrains the hot air in the engine room to the operator. It is, therefore, customary to adopt radiator cooling means of the ambient air forcing type, in which the ambient air is taken into the engine room and forced to pass the radiator to the vehicle front side.

With this means being adopted, the ambient air is raised in temperature by the high heat in the engine room, especially by the radiation heat from the engine exhaust muffler. Thus, there arises a problem that the radiator cooling efficiency is low.

A technique for improving the low cooling effect has been disclosed in Japanese Patent Laid-Open No. 74036/1975 (U.S. Pat. No. 3,866,580). In order to prevent the temperature of the cooling wind taken into the engine enclosure by the fan from being raised by the radiation heats from the engine and the muffler and to prevent the radiation heat from transferring to the heat exchanger such as the radiator, according to the Publication, the inside of the engine enclosure is partitioned into a chamber including the muffler and the engine and a chamber including the fan and the heat exchanger. The technique of the Publication is further constructed by forming an ambient air inlet port in the enclosure of the chamber on the side of the fan and the heater exchanger, and by disposing radiation heat releasing means on the side of the muffler and the engine room.

According to the aforementioned prior art, it is possible to attain the effects to improve the cooling efficiency and to lower the noise. In order to partition the engine enclosure to dispose the heat exchanger and the fan therein, however, it is necessary to add a separate construction of an air intake passage for introducing the ambient air into the isolated heat exchanger and fan chambers. As a result, the construction to screen or isolate the inside of the engine enclosure into the chamber for the engine and the muffler and the chamber for the heat exchanger and the fan is troubled by a problem that the engine enclosure itself is longitudinally elongated to complicate and enlarge the structure thereby to raise the manufacture cost and the final price.

SUMMARY OF THE INVENTION

An object of the invention is to provide an engine enclosure for a construction vehicle which can be simply constructed and small-sized while improving the cooling efficiency and lowering the noise.

According to the invention of a first aspect, there is provided an engine enclosure for a construction vehicle of the cooling type, in which the cooling ambient air taken into an engine room from ambient air inlet ports formed in an engine hood enclosing the engine and in two engine side covers is forced by a fan toward a heat exchanger in front of the engine, comprising: an ambient air screening wall surrounding a muffler, which is disposed in an over-engine space defined in the engine room by the engine hood and the two engine side covers, so that the taken cooling ambient air may flow to the fan without any contact with the muffler.

With the ambient air screening wall, according to the invention, the cooling ambient air flows to the fan without contacting with the muffler. Therefore, the air around the muffler especially at a high temperature in the engine room and the cooling ambient air to be taken from the engine hood and the engine side covers can be screened from each other to reduce the temperature rise of the cooling ambient air to be fed to the heat exchanger such as the radiator or the oil cooler. As a result, it is possible to improve the cooling efficiency.

By the ambient air screening wall, on the other hand, the cooling ambient air taken flows to the fan without contacting with the muffler so that the chamber including the muffler and the engine and the chamber including the fan and the heat exchanger need not be isolated to make a simple construction and to reduce the size. As a result in the improvement in the cooling efficiency, moreover, the fan RPM (Revolutions Per Minute) can be reduced at the same heat radiation thereby to lower the noise.

In the invention, the ambient air screening wall may have any construction if the cooling ambient air taken flows to the fan without contacting the muffler.

According to the invention of a second aspect, the ambient air screening wall around the muffler includes: a first muffler screening partition disposed in the engine hood so that the ambient air taken from the ambient air inlet port formed in the engine hood may flow without contacting with the upper face or front face sides of the muffler; and second muffler screening partitions disposed in the two engine side covers so that the ambient air taken from the ambient air inlet ports formed in the two engine side covers may flow without contacting with the two sides of the muffler.

In addition to the effects of the first aspect, according to this invention, the ambient air screening wall is constructed to include the first muffler screening partition disposed in the engine hood and second muffler screening partitions disposed in the two engine side covers, so that the ambient air flow, as might otherwise contact with the muffler, can be screened at a low cost by the simple construction.

On the other hand, the cooling ambient air does not flow around the muffler. Therefore, the ambient air is not exposed to the radiation from the muffler so that the cooling efficiency of the heat exchanger can be enhanced.

According to the invention of a third aspect, the first muffler screening partition disposed in the engine hood is constructed of an ambient air passing duct to the fan, as attached to the inner side of the engine hood in a manner to confront the ambient air inlet port of the engine hood.

In this invention, the cooling ambient air taken from above the engine room is entrained to the fan without contacting with the muffler positioned on the outer side of the duct so that a contribution is made to the improvement in the cooling efficiency of the heat exchanger.

In the invention, the partition confronting the muffler side of the duct is preferably inclined downward toward the fan or formed into a gentle curve.

According to the invention of a fourth aspect, the second muffler screening partitions disposed in the two engine side covers are constructed of ambient air screening plates to the muffler, as attached at a spacing from the side covers to the inner sides of the side covers in a manner to confront the ambient air inlet ports of the two engine side covers.

In this invention, the cooling ambient air taken from the sides of the engine room flows along the ambient air screening plates so that its flow is smoothened. Moreover, the ambient air is guided to the fan without any contact thereby to lower the ambient noise.

In the invention, it is preferred that the ambient air screening plates are inclined transversely obliquely from the side covers to the fan.

According to the invention of a fifth aspect, the ambient air passing duct to the fan, as attached to the engine hood, has an ambient air guide portion inclined from the engine hood toward the fan while covering the upper side and the front side of the muffler.

In this invention, the flow of the cooling ambient air taken from above the engine room is smoothened to the fan so that the cooling efficiency can be improved.

According to the invention of a sixth aspect, the ambient air screening plates to the muffler, as attached to the inner sides of the two side covers, have guide portions for guiding the ambient air flow toward the fan.

In this invention, the flows of the cooling ambient air taken from the sides of the engine room are smoothened to the fan so that the cooling efficiency can be improved.

DESCRIPTION OF THE PREFERRED EMBODIMENT

The present invention will be described in connection with its one embodiment with reference to the accompanying drawings.

Figure 1:
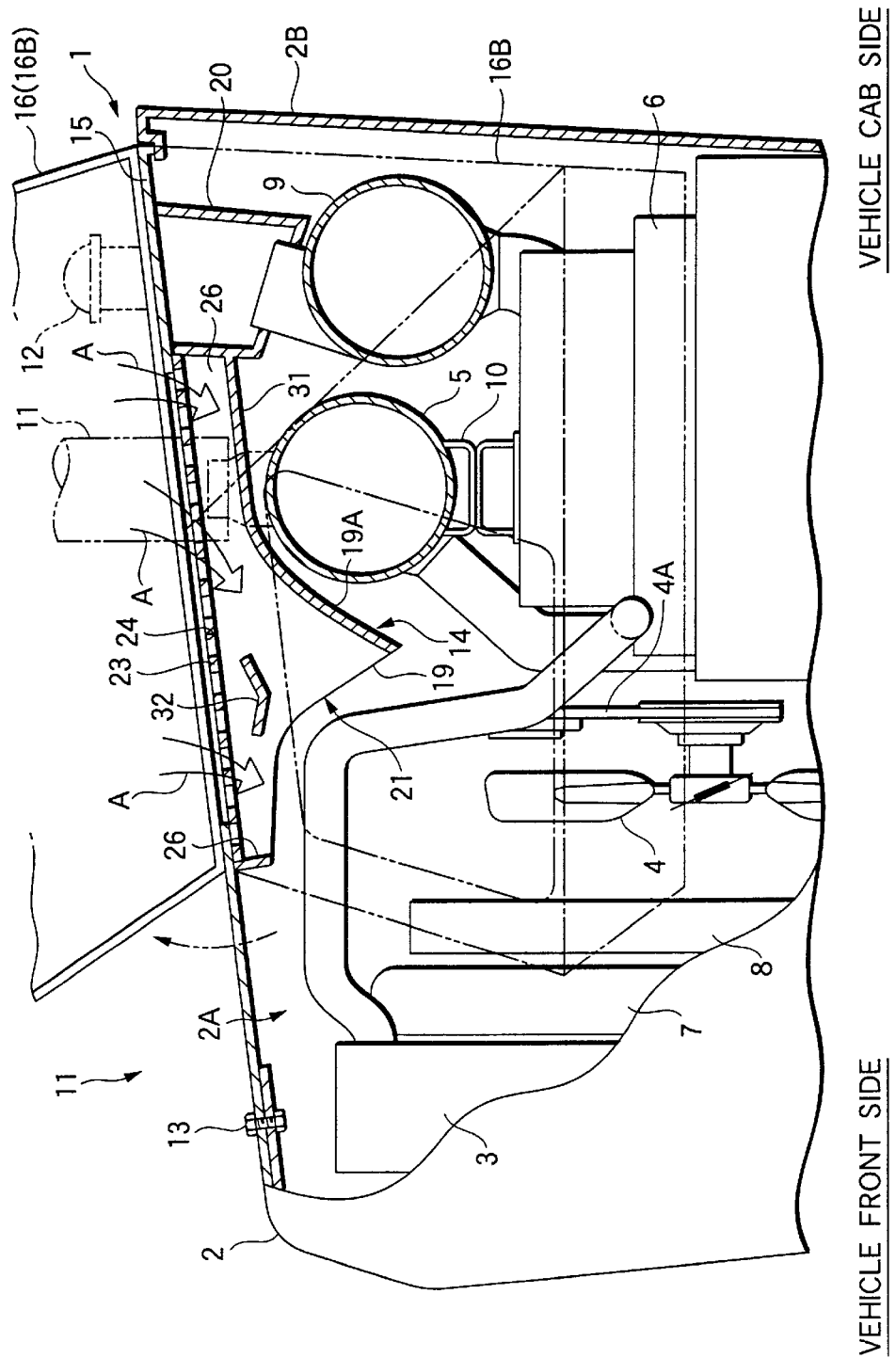
FIG. 1 is a sectional view showing a portion in the vicinity of an engine room of a vehicle body, which is provided with an engine enclosure for a construction vehicle according to an embodiment of the present invention.

In an engine room 2A of a construction vehicle 2, as shown in FIG. 1, there are arranged a radiator 3 or a heat exchanger, a fan 4 and an engine 6 sequentially in the recited order from the vehicle front. Between the radiator 3 and the fan 4, there are arranged an oil cooler 7 and an after-cooler 8. On the cab side of the muffler 5, there is arranged an air cleaner 9 which is mounted on the engine 6. On the other hand, the muffler 5 is mounted on the engine 6 by a bracket 10.

An engine cover 1 acting as the engine enclosure of the construction vehicle of the embodiment is mounted on a vehicle body 2B for covering the engine room 2A.

Figure 2:
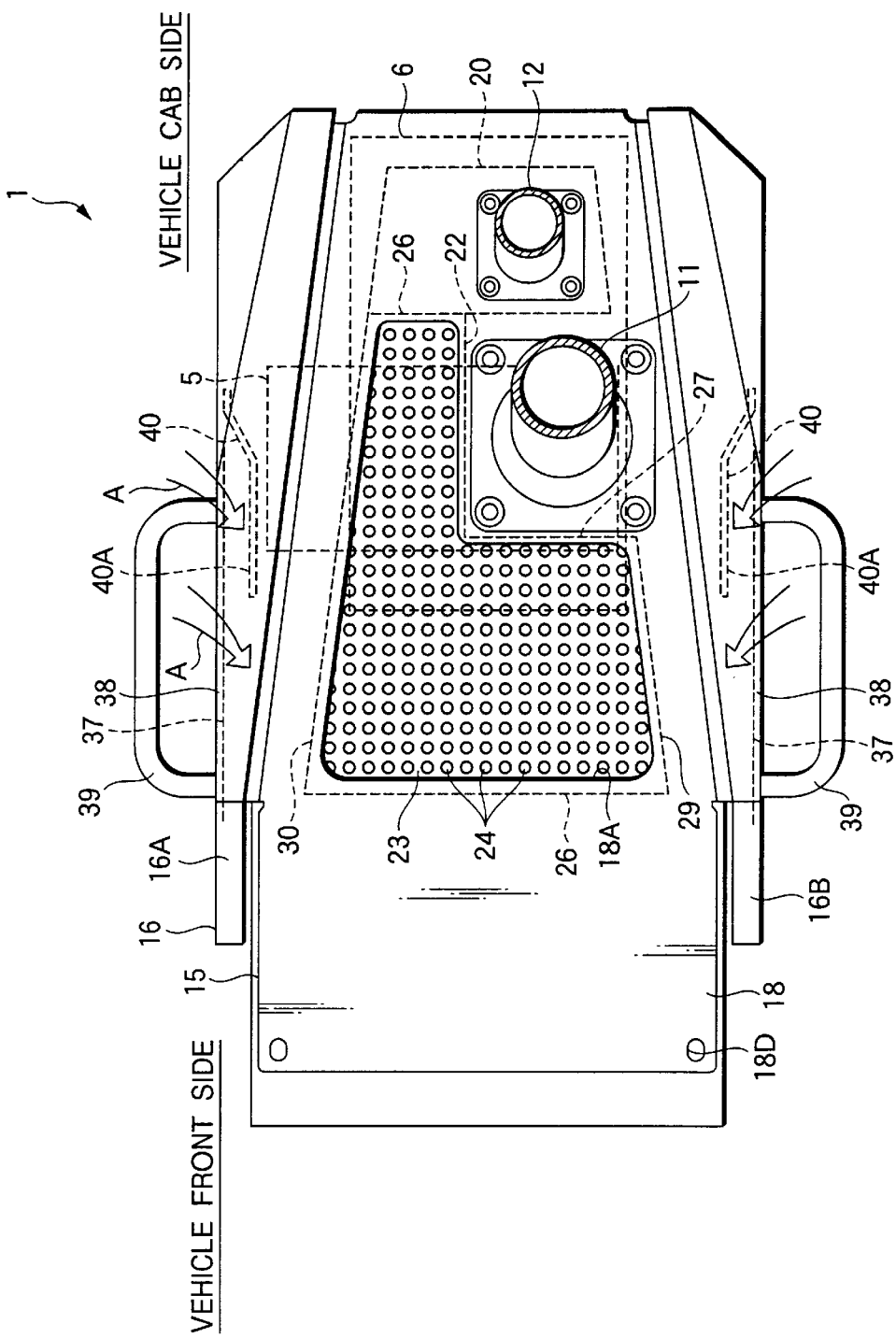
FIG. 2 is a view taken along arrow II of FIG. 1.
Figure 3:
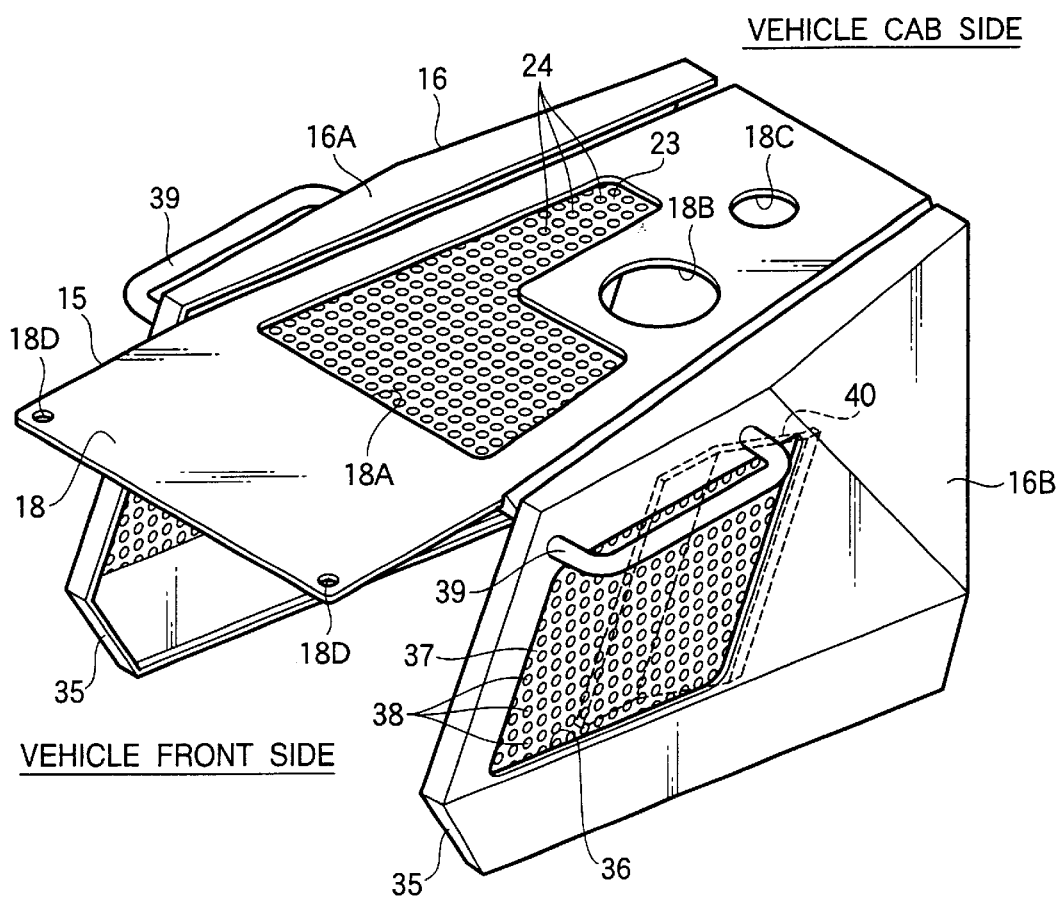
FIG. 3 is a perspective view showing the entirety of the engine enclosure of the construction vehicle of the embodiment.
Figure 4:
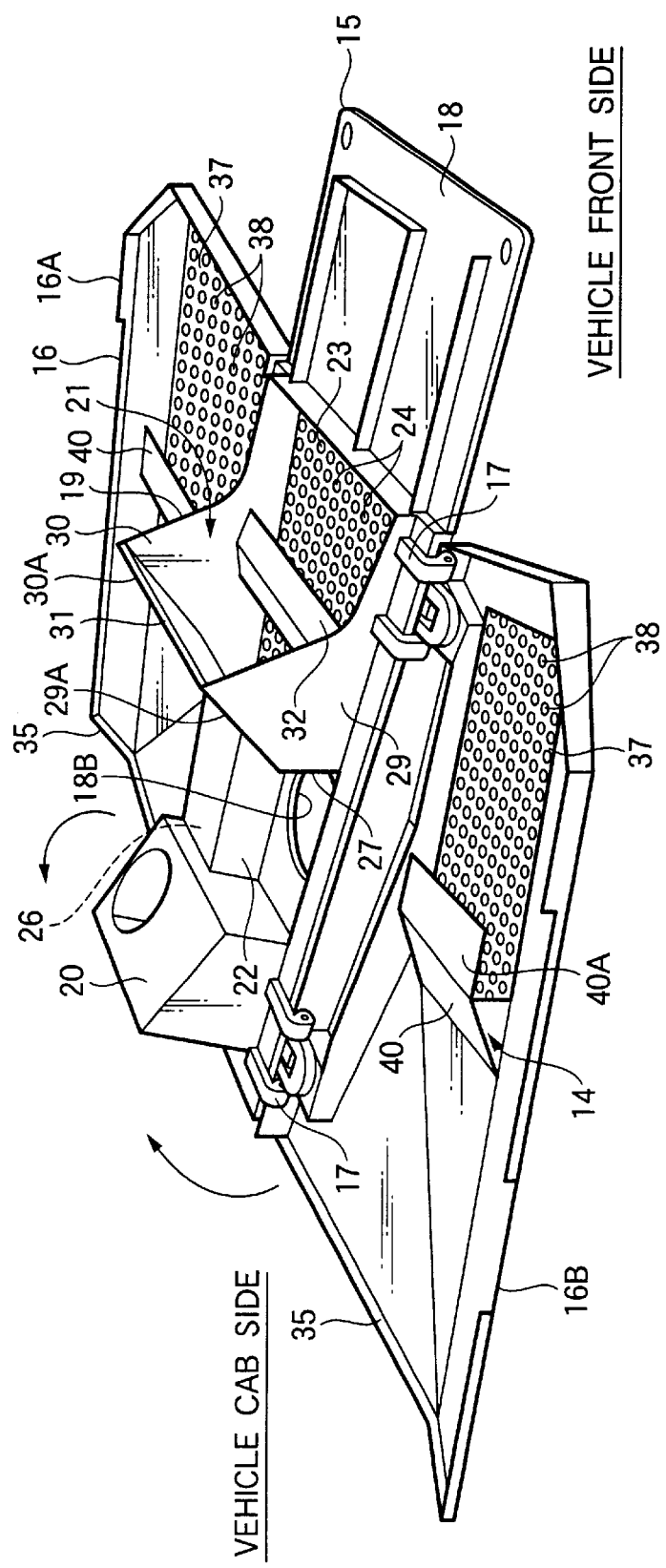
FIG. 4 is a perspective view showing the entirety, as taken from the back, of the engine enclosure of the construction vehicle of the embodiment.

As also shown in FIGS. 2 to 4, the engine cover 1 is constructed to include: an engine hood 15 for covering the upper face of the engine room 2A; and a set of engine side covers 16 for covering the two sides of the engine room 2A. These engine side covers 16 are formed of a right side cover 16A, as located on the righthand side of the cab, and a left side cover 16B, as located on the lefthand side of the cab. These right and left side covers 16A and 16B are so hinged at 17 to the engine hood 15 as can be opened/closed.

The engine hood 15 is formed to include: a plate-shaped cover body 18; a duct 19 or a first ambient air screening partition 19 attached to the lower portion of the cover body 18; and an air cleaner duct 20 formed in the cover body 18 and connected to the air cleaner 9.

The cover body 18 is formed into such a flat shape as is slightly converged from the vehicle front side to the vehicle cab side. At the substantially central portion of the cover body 18, there is formed a generally L-shaped opening 18A, in which a punching metal 23 is fitted from the back of the cover body 18 to shut the opening 18A. Moreover, this punching metal 23 has a number of holes, which provide an upper ambient air inlet port 24 forming the ambient air passing holes.

In the vicinity of the opening 18A of the cover body 18, as shown in FIG. 3, there are opened an exhaust hole 18B and an air inlet port 18C. As shown in FIGS. 1 and 2, an exhaust pipe 11 is inserted into the exhaust hole 18B, and air intake unit 12 is inserted into the air inlet port 18c. Moreover, bolt holes 18D are formed in the front side end portions, i.e., in the two widthwise ends of the cover body 18.

When the engine cover 1 is to be mounted on the vehicle body 2B, the cover body 18 is placed at a predetermined position on the vehicle body 2B. After this, bolts 13 are inserted into the bolt holes 18D and are fastened by nuts on the side of the vehicle body 2B. Thus, the cover body 18 and accordingly the engine cover 1 are mounted on the vehicle body 2B.

The duct 19 is disposed to face the ambient air passing area of the engine hood 15, i.e., a portion of the area of the upper ambient air inlet port 24 thereby to enclosure the outer periphery of the opening 18A of the engine hood 15.

As shown in FIGS. 2 and 4, more specifically, the duct 19 is formed into a frame shape, which is composed of: a left partition 29 and a right partition 30 disposed on the two widthwise sides of the back (on the side of the engine 6) of the cover body 18; and a hood partition 31 and a side member 22 jointing the lower ends of the left and right partitions 29 and 30, thereby to provide an air passage 26 in their space and an outlet port 21 for the cooling ambient air on their vehicle front side. Here, a wall member 27 is disposed on the end portions of the side member 22, the left partition 29 and the hood partition 31.

The hood partition 31 of the duct 19 is jointed at its one end to the side of the air cleaner duct 20, as shown in FIG. 1. The leading end of the hood partition 31 is formed into a guide portion 19A extending around the outer circumference of the muffler 5 and inclined obliquely downward toward the fan 4 so that the ambient air flow may be guided to the fan 4 without any contact with the muffler 5.

Between the left partition 29 and the right partition 30 and closer to the cover body 18, as shown in FIGS. 1 and 4, there spans a drip member 32 which is formed by folding a plate into a doglegged section, with its recessed side confronting the cover body 18. This drip member 32 is arranged substantially above a fan belt 4A for turning the fan 4 so that rain drops or the like may be prevented from dripping directly on the fan belt 4A.

The right side cover 16A and the left side cover 16B are given substantially identical structures but are formed into mirror-image shapes. Therefore, the left side cover 16B will be mainly described in the following.

The left side cover 16B is formed by folding a plate member into a shape having an edge portion 35 directed toward the engine room 2A and slightly bulging outward, and is sized to cover the individual sides of the upper portions of the after-cooler 8, the fan 4, the muffler 5, the air cleaner 9 and the engine 6 as shown in FIG. 1.

In the left side cover 16B closer to the vehicle front, as shown in FIG. 3, there is formed a square opening 36, in which a punching metal 37 is fitted from the back of the left side cover 16B to shut the opening 36. Moreover, the numerous holes of the punching metal 37 form a transverse ambient air inlet port 38 constructing the ambient air passing holes. To the upper position of the opening 36, on the other hand, there is attached a grip 39, which is grasped to open/close the left side cover 16B.

Here, the left side cover 16B is fixed, when shut, on the vehicle body 2B by the not-shown fastener or the like.

To the inner side of the left side cover 16B, there is so attached an ambient air screening plate 40 or a second screening partition having a doglegged section as is spaced from the punching metal 37. This ambient air screening plate 40 guides cooling ambient air to the fan 4 and is fixed to confront the area of a portion of the transverse ambient air inlet port 38 of the opening 36 and to have a leading end formed into a guide portion 40A inclined obliquely transversely toward the fan 4 so as to guide the cooling ambient air. In short, the ambient air screening plate 40 is so attached that one doglegged side of its other end may be parallel to the face of the punching metal 37.

This ambient air screening plate 40 is sized to cover the vertical entirety of the opening 36 and to confront a portion of the area of the opening 36 when the left side cover 16B is closed.

In the right side cover 16A, too, there is formed the opening 36, in which the punching metal 37 is fitted from the back, so that the numerous holes of the punching metal 37 forms the transverse ambient air inlet port 38 constructing the ambient air passing holes. To the right side cover 16A, there is also attached the ambient air screening plate 40.

Moreover, the duct 19 and the two side ambient air screening plates 40 construct the ambient air flow screening wall 14.

The engine cover 1 thus constructed is attached to the vehicle body 2B. When the drive of the vehicle is started, the cooling ambient air is taken into the engine room 2A, as indicated by arrow A in FIG. 1, as the fan 4 rotates. At this time, the cooling ambient air taken from the upper ambient air inlet port 24 of the engine hood 15 is guided, while being kept away from any contact with the muffler 5 by the partition 31 of the duct 19, to flow from the outlet port 21 via the air passage 26 to the fan 4 and the radiator 3 thereby to cool the radiator 3 and so on.

As indicated by arrow A in FIG. 2, the ambient air, as sucked from the transverse ambient air passing holes 38 of the right and left side covers 16A and 16B, flows along the ambient air screening plates 40 of the individual covers 16A and 16B so that it is sucked without any contact with the muffler 5 from the outlet port to the radiator 3 thereby to cool the radiator 3 and so on.

Of the air around the muffler 5, the inner hot air, as surrounded by the duct 19 of the engine hood 15 and by the individual ambient air screening plates 40 of the right and left side covers 16A and 16B, does not reside but is exhausted to the atmosphere through the exhaust pipe 11 by the venturi action between the muffler 5 and the exhaust pipe 11.

The following effects can be obtained according to the embodiment thus far described.

(1) The ambient air flow to pass the upper face and the front face sides of the muffler 5 and the ambient air flow to pass along the side of the muffler 5 are guided to the fan 4 without any contact with the muffler 5, respectively, by the duct 19 attached to the lower portion of the engine hood 15 and by the ambient air screening plates 40 mounted on the two side covers 16A and 16B. In the engine room 2A, therefore, the air around the muffler 5 especially at a high temperature and the ambient air to be sucked from the engine hood 15 and the side covers 16A and 16B can be screened from each other. As a result, the cooling ambient air to be fed to the heat exchanger such as the radiator 3 or the oil cooler 7 can be suppressed in its temperature rise so that the cooling efficiency can be improved.

(2) As a result that the cooling efficiency can be improved, as described above, the RPM of the fan 4 can be reduced at the same heat radiation from the muffler 5 or the like so that the noise can be lowered.

(3) The engine cover 1 is constructed to include the engine hood 15 and the two side covers 16A and 16B, and the engine hood 15 is equipped with the duct 19 having the hood partition 31 whereas each of the two side covers 16A and 16B is equipped with the ambient air screening plate 40. By these components, the cooling ambient air is guided to flow to the fan 4 without any contact with the muffler 5. Therefore, the engine enclosure need not be screened into a chamber including the muffler and the engine and a chamber including the fan and the heat exchanger, so that the engine cover 1 can be given a simple structure and small-sized.

(4) The cooling ambient air from the upper part to the engine room 2A flows obliquely downward along the guide portion 19A, as formed in the hood partition 31 of the duct 19, toward the fan 4. As a result, the flow is smoothened so that the ambient air is forced to the fan 4 without any collision thereby to lower the ambient noise.

(5) The ambient air from the sides to the engine room 2A flows along the ambient air screening plates 40 which are disposed at the two side covers 16A and 16B and which are transversely inclined at their leading end portions 40A toward the fan 4. As a result, the flow is smoothened so that the ambient air is forced to the fan 4 without any collision thereby to lower the ambient noise.

(6) The drip member 32 spans between and over the left partition 29 and the right partition 30 and is arranged just above the fan belt 4A for turning the fan 4. Even if rain drops, therefore, it is prevented from dropping directly on the fan belt 4A so that the fan belt 4A can have an elongated lifetime.

Here, the present invention should not be limited to the foregoing embodiment but may contain another modification if its object can be achieved.

In the embodiment, for example, the upper ambient air inlet port 24 of the engine hood 15 and the transverse ambient air inlet ports 38 of the side covers 16A and 16B are formed of the numerous holes of the punching metals 23 and 37. The invention should not be limited to that construction but may be modified such that lattices are made of rods in the opening 18A of the engine hood 15 and in the openings 36 of the side covers 16A and 16B thereby to form the ambient air inlet holes.

In the embodiment, on the other hand, the ambient air screening plates 40, which are disposed at the two side covers 16A and 16B and inclined transversely, are formed to have the doglegged sections. However, the invention should not be limited thereto but may be exemplified by a flat plate shape. In short, it is sufficient that the ambient air screening plates 40 can guide the cooling ambient air to the fan 4 without any contact with the muffler 5.

In the embodiment, moreover, the drip member 32 is formed into the doglegged section. However, the invention should not be limited thereto but may be exemplified by a flat plate shape. In short, it is sufficient that the drip member 32 can prevent the rain or the like from dropping directly to the fan belt 4A. With this modification, the drip member can be easily manufactured without folding it.

In the embodiment, on the other hand, the grip 39 is attached to the upper portions of the two side covers 16A and 16B. However, the grip 39 may be attached to any position such as the lower portions. With this modification, the two side covers 16A and 16B can be opened/closed by a less power.

According to the engine enclosure for the construction vehicle of the present invention, as has been described hereinbefore, the cooling ambient air is guided to flow to the fan without any contact with the muffler by the ambient air screening walls. Therefore, the air around the muffler especially at the high temperature in the engine room and the cooling ambient air to be taken from the engine hood and the engine side covers can be screened from each other. As a result, the temperature rise of the cooling ambient air to be fed to the heat exchanger such as the radiator or the oil cooler can be reduced to improve the cooling efficiency.

By the ambient air screening walls, on the other hand, the cooling ambient air taken is guided to flow to the fan without any contact with the muffler so that the chamber including the muffler and the engine and the chamber including the fan and the heat exchanger need not be screened from each other. As a result, the engine enclosure can be simply constructed and small-sized.

As a result of improving the cooling efficiency, moreover, the RPM of the fan can be reduced for a radiation thereby to lower the noise.

What is claimed is:

1. An engine enclosure for cooling an engine of a construction vehicle, in which cooling ambient air taken into an engine room from ambient air inlet port formed in an engine hood enclosing the engine and in two engine side covers in forced by a fan toward a heat exchanger in front of the engine, comprising:
    an ambient air screening wall surrounding a muffler, the ambient air screening wall being arranged above the engine in the engine room formed by the engine hood and the two engine side covers, the ambient air screening wall having a three-dimensional duct structure and directing flow of the cooling ambient air into the engine room and toward the fan without any contact with the muffler and engine.

2. An engine enclosure for cooling an engine of a construction vehicle in which cooling ambient air taken into an engine room from ambient air inlet ports formed in an engine hood enclosing the engine and in two engine side covers is formed by a fan toward a heat exchanger in front of the engine, comprising:
    an ambient air screening wall surrounding a muffler, which is disposed in an over-engine space defined in the engine room by the engine hood and the two engine side covers, so that the taken cooling ambient air may flow to the fan without any contact with the muffler;
    the ambient air screening wall around the muffler including:
        a first muffler screening partition disposed in the engine hood so that the ambient air taken from the ambient air inlet port formed in the engine hood may flow without contacting with the upper face or front face sides of the muffler; and
        second muffler screening partitions disposed in the two engine side covers so that the ambient air taken from the ambient air inlet ports formed in the two engine side covers may flow without contacting with the two sides of the muffler.

3. An engine enclosure for cooling an engine of a construction vehicle according to claim 2,
    wherein the first muffler screening partition disposed in said engine hood is constructed of an ambient air passing duct to the fan, as attached to the inner side of said engine hood in a manner to confront the ambient air inlet port of the engine hood.

4. An engine enclosure for cooling an engine of a construction vehicle according to claim 2,
    wherein the second muffler screening partitions disposed in said two engine side covers are constructed of ambient air screening plates to the muffler, as attached at a spacing from the side covers to the inner sides of said side covers in a manner to confront the ambient air inlet ports of said two engine side covers.

5. An engine enclosure for cooling an engine of a construction vehicle according to claim 3,
    wherein said ambient air passing duct to the fan, as attached to said engine hood, has an ambient air guide portion inclined from said engine hood toward the fan while covering the upper side and the front side of said muffler.

6. An engine enclosure for cooling an engine of a construction vehicle according to claim 4,
    wherein said ambient air screening plates to the muffler, as attached to the inner sides of said two side covers, have guide portions for guiding the ambient air flow toward said fan.

7. An engine enclosure for cooling an engine of a construction vehicle, in which cooling ambient air taken into an engine room from ambient air inlet ports formed in an engine hood enclosing the engine and in two engine side covers is forced by a fan toward a heat exchanger in front of the engine, comprising:
    an ambient air screening wall surrounding a muffler, the ambient air screening wall being arranged above the engine in the engine room formed by the engine hood and the two engine side covers, the ambient air screening wall having a three-dimensional duct structure and directing flow of the cooling ambient air into the engine room and toward the fan without any contact with the muffler.

* * * * *